(12) United States Patent
Cuevas Villoslada et al.

(10) Patent No.: US 11,363,823 B2
(45) Date of Patent: Jun. 21, 2022

(54) METHOD FOR PRESERVING FRESH JUICE OF CITRUS FRUITS AND POMEGRANATES

(71) Applicant: XEXPRIMIR, S.L., Pradejon (ES)

(72) Inventors: Eduardo Cuevas Villoslada, Autol (ES); Florentino Deza San Baudilio, Calahorra (ES)

( * ) Notice: Subject to any disclaimer, the term of this patent is extended or adjusted under 35 U.S.C. 154(b) by 286 days.

(21) Appl. No.: 16/463,645

(22) PCT Filed: Nov. 22, 2017

(86) PCT No.: PCT/ES2017/070770
§ 371 (c)(1),
(2) Date: May 23, 2019

(87) PCT Pub. No.: WO2018/096199
PCT Pub. Date: May 31, 2018

(65) Prior Publication Data
US 2021/0212331 A1    Jul. 15, 2021

(30) Foreign Application Priority Data

Nov. 23, 2016    (ES) .............................. ES201631506

(51) Int. Cl.
| | | |
|---|---|---|
| *A23B 7/055* | (2006.01) | |
| *A23L 2/04* | (2006.01) | |
| *A23L 2/06* | (2006.01) | |
| *A23L 2/44* | (2006.01) | |
| *B65B 25/00* | (2006.01) | |
| *B65B 31/02* | (2006.01) | |

(52) U.S. Cl.
CPC ................ *A23B 7/055* (2013.01); *A23L 2/04* (2013.01); *A23L 2/06* (2013.01); *A23L 2/44* (2013.01); *B65B 25/001* (2013.01); *B65B 31/025* (2013.01); *A23V 2002/00* (2013.01)

(58) Field of Classification Search
CPC ... A23B 7/055; A23L 2/04; A23L 2/44; B65B 25/001; B65B 31/025; A23V 2002/00
USPC ................ 426/599, 615, 474, 486, 487, 524
See application file for complete search history.

(56) References Cited

U.S. PATENT DOCUMENTS 3,435,632 A  *  4/1969  Fallin

FOREIGN PATENT DOCUMENTS

| CN | 105219574 | * | 1/2016 |
|----|-----------|---|--------|
| CN | 105219574 A | * | 1/2016 |
| ES | 2080484 | | 2/1996 |
| ES | 2133235 | | 9/1999 |
| WO | 9307765 | | 4/1993 |

OTHER PUBLICATIONS

"Dry Ice: Use and Advantages", pp. 1-3, https://carbonica.ro/en/dry-ice, 2022. (Year: 2022).*

* cited by examiner

*Primary Examiner* — Helen F Heggestad
(74) *Attorney, Agent, or Firm* — Sanchelima & Associates, P.A.; Christian Sanchelima; Jesus Sanchelima

(57) ABSTRACT

The invention relates to a method for preserving the fresh juice of citrus fruits or pomegranates following the conventional treatment of the fruit and corresponding extrusion or expression of same to obtain the juice. The method consists of: applying, prior to introducing the juice into a container, $CO_2$ in the form of carbonic snow, which removes the oxygen content in the container; then introducing the juice continuously; subsequently adding, according to the characteristics of the juice, a dose of liquid nitrogen that allows the atmosphere of the headspace thereof to be corrected; and hermetically sealing the container, such that the absence of oxygen therein is ensured, preventing the product from oxidising and increasing the durability thereof, as long as said product is preserved at a final temperature between 1 and 4° C.

5 Claims, No Drawings

METHOD FOR PRESERVING FRESH JUICE OF CITRUS FRUITS AND POMEGRANATES

PURPOSE OF THE INVENTION

This invention relates to a method for preserving the fresh juice of fruits, especially citrus fruits and pomegranates, cold-preserved (0-8° C.), and can be used for the juices of other fruits and vegetables or mixtures of these. The preservation of the juice is achieved through the proper disinfection of the raw material, the minimum oxygen content inside the container, after packaging the recently squeezed juice, and the modification of the atmosphere in the headspace between the juice and the container lid.

The purpose of the invention is to preserve the juice with no type of thermal treatment before or after packaging, for a minimum of nine days, deferring its oxidation and maintaining all of the natural properties of the fresh juice.

BACKGROUND OF THE INVENTION

There are different processes that allow fruit juices to be preserved using the application of gases.

Specifically, invention patent ES 2080484 describes a method for preserving juice from fresh fruits and mixtures of fruit juices where, following the disinfection of the fruit and corresponding juice extraction, this juice is gasified with a gaseous mixture based on oxygen and carbon dioxide, carrying out the hermetic sealing of the container and rapid cooling of the juice in the container.

The gaseous mixture, due to containing oxygen, leads to the premature oxidation of the product, in this case the juice, meaning its preservation is limited, or in other words, the organoleptic properties of the juice, such as its taste, aroma, colour, etc., deteriorate over time precisely due to the existence of this oxygen in contact with the product.

DESCRIPTION OF THE INVENTION

The advocated method allows for the stable preservation of the organoleptic properties of the natural juice, preserving it in its recently-squeezed condition for longer.

More specifically, according to the method involved in this invention, the preservation is carried out with a total absence of oxygen, so before adding the juice to the corresponding container in which it is intended to be preserved, carbonic snow is applied. Its sublimation occurs when the juice is subsequently poured inside it, due to coming into contact with this juice, and it passes directly to a gaseous form. This removes all the oxygen from inside the container and creates a protection or barrier that slows down the rapid oxidation of the product.

Immediately afterwards, and optionally, depending on the pH and sugar content of the juice, a drop of liquid nitrogen is added onto the juice that, also taking advantage of its sublimation process, creates a new sweep that once again removes the oxygen remaining inside it. Immediately following this, a screw cap is put in place and this achieves a hermetic seal.

The exact amount of carbonic snow (and, where appropriate, liquid nitrogen) to be used will depend on the pH and sugar content of the recently squeezed juice, indicators that change throughout the year depending mainly on the variety of the citrus or other fruits available, as well as their degree of ripeness, a range of between 0.01 and 0.2% of the total quantity of juice to be packaged being considered as an optimum amount.

EXAMPLE EMBODIMENT OF THE INVENTION

The fruit whose juice is intended to be obtained is stored in a cold chamber in which the temperature is between 0° and 8° C.

To start the extrusion or juicing process, the fruit must be warmed up for several hours in a dry and disinfected area until they reach an interior temperature of over 10° C., as this helps with the next process.

Next, the external surface of the fruit is disinfected using one or more industrial washes with plenty of water with a high chlorine content. After a thorough rinse, and checking that they have been properly disinfected and that any remaining chlorine has been removed, the fruit is immediately sent to the extrusion or juicing line.

Next, once the juice has been obtained it is placed in a sealed container for its rapid cooling to a temperature of between 1° and 4° C., allowing for its proper preservation in the brief space of time before it is sent to the immediate packaging process.

Before placing the juice into the container (mainly bottles or containers with a capacity ranging from 200 ml to 5000 ml) in which it will be preserved, a dose of $CO_2$ in the form of "carbonic snow" is added to the container. Its sublimation occurs when the juice is subsequently poured in, due to coming into contact with that juice, passing directly to a gaseous form that causes a sweep and removal of all the oxygen inside it, creating a protection or barrier over the juice that will slow down the normal oxidation of the product.

Immediately afterwards, and optionally, depending on the pH and sugar content of the juice, specifically provided that its sugar content is over 12.5 Brix degrees and/or the pH level is higher than 3.85, a drop of liquid nitrogen is added on to the juice that, also taking advantage of its sublimation process, performs a new sweep that, in addition to removing the oxygen that remains inside it, contributes through with its disinfecting properties.

The screw cap is immediately put in place after this, achieving a hermetic seal of the containers for their preservation in a cold chamber at a temperature ranging between 1° and 4° C.

The exact amount of $CO_2$ in the form of carbonic snow and liquid nitrogen to be used will depend on the pH and sugar content of the recently squeezed juice, indicators that change throughout the year depending mainly on the variety of the citrus or other fruits available, as well as their degree of ripeness, a range of between 0.01 and 0.2% of the total quantity of juice to be packaged being considered as an optimum amount in both cases.

In this way, it is possible to maintain the original organoleptic qualities of the juice for a period of time greater than nine days, by definitively avoiding the usual oxidation and deterioration of the juice that occurs in the traditional methods.

The invention claimed is:
1. A method for preserving fresh fruit and vegetable juices, consisting of the steps of:
   A) cooling and disinfecting a predetermined amount of fruit and/or vegetable;
   B) squeezing the juice from said fruit and/or vegetable;
   C) pouring said juice in a first container;
   D) introducing $CO_2$ in the form of carbonic snow in a second container until the oxygen in said first container is removed; and

E) immediately pouring said juice from said first container to the second container that is hermetically sealed and kept within a temperature range between 1 and 4 degrees centigrade.

2. Method for preserving fresh fruit and vegetable juices, as mentioned in claim 1, characterized by, optionally and immediately after having filled the container with juice and before its hermetic sealing, a drop of liquid nitrogen is added to the container.

3. Method for preserving fresh fruit and vegetable juices, as mentioned in claim 2, characterized by the application of liquid nitrogen is carried out provided that the sugar content of the juice is over 12.5 Brix degrees and/or the pH level is higher than 3.85.

4. Method for preserving fresh fruit and vegetable juices, as mentioned in claim 2, characterized by the application of liquid nitrogen is carried out at a proportion of between approximately 0.01% and 0.2% of the total volume of juice to be poured into the container.

5. Method for fresh fruit and vegetable juices, as mentioned in claim 1, characterized by the application of $CO_2$ in the form of is carbonic snow carried out at a proportion of between approximately 0.01% and 0.2% of the total volume of juice to be poured into the container.

* * * * *